United States Patent
Gurevich

(10) Patent No.: US 6,950,213 B1
(45) Date of Patent: Sep. 27, 2005

(54) FAST METHOD FOR FAX ENCODED DATA CONVERSION

(75) Inventor: Vladimir Alexandrovich Gurevich, Fremont, CA (US)

(73) Assignee: Cisco Systems, Inc., San Jose, CA (US)

( * ) Notice: Subject to any disclaimer, the term of this patent is extended or adjusted under 35 U.S.C. 154(b) by 1038 days.

(21) Appl. No.: 09/742,552

(22) Filed: Dec. 20, 2000

(51) Int. Cl.[7] ............................................... H04N 1/21
(52) U.S. Cl. .................. 358/401; 358/539; 358/426.07; 358/407; 358/1.15; 379/100.09; 282/245; 282/232
(58) Field of Search ................................ 358/401, 539, 358/426.07, 426.04, 426.16, 426.13, 407, 1.15, 442; 382/232, 245, 233, 176; 379/100.09

(56) References Cited

U.S. PATENT DOCUMENTS

| | | | |
|---|---|---|---|
| 4,918,722 A | | 4/1990 | Duehren et al. |
| 5,291,546 A | | 3/1994 | Giler et al. |
| 5,317,645 A | * | 5/1994 | Perozek et al. ............. 382/141 |
| 5,369,686 A | | 11/1994 | Dutra et al. |
| 5,488,651 A | | 1/1996 | Giler et al. |
| 5,594,732 A | | 1/1997 | Bell et al. |
| 5,680,612 A | * | 10/1997 | Asada et al. .................. 707/3 |
| 5,712,907 A | | 1/1998 | Wegner et al. |
| 5,754,750 A | * | 5/1998 | Butterfield et al. ......... 345/418 |
| 5,767,985 A | | 6/1998 | Yamamoto et al. |
| 5,805,298 A | | 9/1998 | Ho et al. |
| 5,812,278 A | | 9/1998 | Toyoda et al. |
| 5,838,683 A | | 11/1998 | Corley et al. |
| 5,864,711 A | * | 1/1999 | Mairs et al. .................. 710/6 |
| 5,930,466 A | * | 7/1999 | Rademacher ............. 358/1.15 |
| 6,064,771 A | * | 5/2000 | Migdal et al. ............. 382/232 |
| 6,304,928 B1 | * | 10/2001 | Mairs et al. ................. 710/68 |
| 6,496,601 B1 | * | 12/2002 | Migdal et al. ............. 382/239 |
| 6,557,235 B1 | * | 5/2003 | Katz et al. .................... 29/563 |
| 6,658,619 B1 | * | 12/2003 | Chen ......................... 714/748 |
| 6,704,024 B2 | * | 3/2004 | Robotham et al. .......... 345/581 |
| 6,711,294 B1 | * | 3/2004 | Hamzy et al. ............. 382/232 |
| 6,748,115 B1 | * | 6/2004 | Gross ........................ 382/237 |

FOREIGN PATENT DOCUMENTS

WO    WO 97/18665    5/1997

* cited by examiner

Primary Examiner—Kimberly Williams
Assistant Examiner—Negussie Worku
(74) Attorney, Agent, or Firm—Marger Johnson & McCollom, P.C.

(57) ABSTRACT

In accordance with an embodiment of the present invention, a fax decoding/re-encoding system for transferring fax images between a sending fax machine and a receiving fax machine includes a decoder responsive to an encoded fax image defined by rows of scan lines. The decoder decodes the scan lines of the encoded fax image and generates run-length representation of the encoded fax image. A scan-line manipulation device is responsive to the run-length representation for manipulating the same and generating a manipulated fax image without generating a bitmap of the encoded fax image. The fax decoding/re-encoding system further including a re-encoder responsive to said manipulated fax image and adaptive to generate a re-encoded fax image that is substantially the same as the encoded fax image, wherein the fax decoding/re-encoding system avoids the need for a bitmap for generating a re-encoded fax image thereby substantially reducing re-encoding time.

13 Claims, 7 Drawing Sheets

FAST METHOD FOR FAX ENCODED DATA CONVERSION

BACKGROUND OF THE INVENTION

1. Field of the Invention

The present invention relates generally to storing and forwarding (transmitting) facsimile (fax) information using remote access servers and particularly to improving the efficiency and costs associated with such fax transmissions by bypassing re-scanning of the fax information.

2. Description of the Prior Art

As use of the Internet has gained popularity in recent years, a variety of different types of information, such as video, audio and fax data, has been transferred using this medium of communication. In the case of fax information, remote access server devices are used to store fax information received from a remotely-located transmitting fax machine and to forward (or re-transmit) the received fax information to a remotely-located receiving fax machine. Once stored within the remote access server and prior to re-transmission thereof, the fax information is decompressed (or decoded) and re-compressed (encoded). The reason for such a seemingly-redundant and unnecessary process is primarily to attempt to detect and to remove any potential errors incorporated within the fax information prior to re-transmission thereof to the receiving fax machine. This is particularly of interest when using fax machines incapable of performing error correction.

Other reasons for such a seemingly unnecessary process include compatibility and cost savings, which will be discussed in further detail hereinbelow. Briefly, a compatibility issue is likely to arise when different encoding schemes are employed. The only encoding scheme guaranteed to be supported by all systems is one-dimensional encoding. Cost savings are effectuated when a fax document is forwarded to a destination that supports a better compression technique than that which was used to encode the original document. In this regard, it may be advantageous to re-encode the original document thereby reducing the size thereof.

In FIG. 1, there is shown a high-level diagram of a prior art conventional fax transmission and reception system 10 including a transmitting fax machine 12, a telephone signal transferring medium 14 and a receiving fax machine 16. The medium 14 is generally a public switching telephone network (PSTN) or plain old telephone system (POTS). Fax information is transmitted, through a telephone line, through the medium 14, to the receiving fax machine 16. During this process, several steps occur as shown in flow chart form in FIG. 2.

In FIG. 2, steps are shown, in flow chart form, of processing of fax information, in the form of a fax document, through the fax machines 12 and 16 of FIG. 1. At step 18, an original fax document is to be transmitted. The original fax document is shown to be scanned into the transmitting fax machine 12 (in FIG. 1), which may optionally store an image of the original fax document in the fax machine 12. Thereafter, at step 20, the image of the original fax document (the scanned document) is encoded and at step 22 the encoded image is transmitted, through the PSTN or POTS medium 24 by dialing the telephone number of the receiving fax machine.

At step 22, after dialing, certain negotiations are conducted to establish communications between the transmitting fax machine 12 and the receiving fax machine 16 prior to the transmission of the scanned and encoded image. For example, during negotiations, the encoding algorithm that is to be used is specified and negotiated. The International Telecommunication Union (ITU) has specified certain parameters for the type of encoding to be employed to properly conduct transfer of fax information between fax machines. Examples of such standards are T.4 and T.6. Additionally, a standard, T.30, entitled "Procedures For Document Facsimile Transmission in the General Switched Public Network" defines other procedural parameters used by fax machines for communications therebetween.

The encoded image is ultimately transmitted through the PSTN or POTS 24 and thereafter received by the fax modem 26. During transmission at step 22, in FIG. 2, the image is transmitted using analog signals, through the conventional telephone system (PSTN or POTS) to the receiving fax machine 16. At step 26, the receiving fax machine 26 converts the analog signal to digital form, i.e. in the form of binary 1's and 0's. Thereafter, the image is provided to the image decoder at step 28. At step 28, the image is decoded (or decompressed) and at step 30, the decoded image is printed, viewed on a monitor or stored in a storage area on a computer system for later viewing.

By way of additional background information, some primary concepts relating to the encoding and decoding of fax information are now discussed. To keep it simple to the reader, this discussion will be limited to black and white fax documents and images only.

An image is generally represented as a matrix of black and white dots (or pixels). In FIG. 3, there is shown an example of a fax image 32 of the words "HELLO!" As shown in FIG. 3, the image 32 is represented by a matrix of 23 columns and 8 rows. Each of the 8 rows is commonly referred to as a scan line. To place things into perspective, a fax page typically includes 1728 columns (1728 dots or pixel in a scan line) and approximately 1100 or 2200 scan lines per letter page. Thus, a typical fax page includes 1728 pixels per scan line×11 inches (length of a fax page)×98 scan lines/inch, or 1.8 million pixels, for a fax page being transmitted using standard resolution. For a high-resolution transmission, typically there are 196 scan lines/inch and thus, 3.6 million pixels in a fax page. It will take $1.8 \times 10^6/8$ or 230 kilobytes of storage capacity to store an 8.5×11 inch page of a fax image using standard resolution and approximately 460 kilobytes of storage space using high resolution.

Without compression being performed, using a fax machine that includes a modem having a speed of 14,400 bits/second (bps), it will take approximately 2 minutes to transmit a page of fax using standard resolution or 4 minutes using high resolution. Fax modem transmission speeds are typically between 2,400 to 14,400 bps. At a speed of 2,400 bps, it will take 12 minutes for one page to be transmitted. Obviously, these kinds of speeds are too slow for the ever-rapidly increasing desire for faster transmission rates, thus, the advent of compression of fax information.

Compression of fax information uses run-length encoding, which takes advantage of the repetitive dots of a black and white fax image to produce a smaller size fax image. For example, where there are 4 black pixels in a row, without run-length encoding or any type of compression, the 4 black pixels would be represented by a sequence of 4 bits of '1's whereas run-length encoding would represent the 4 black pixels by a two-bit representation of the binary number '4' thereby reducing representation of the 4 black pixels from 4 bits to 2 bits. An example of a run-length encoding is shown in FIG. 4.

In FIG. 4, representation of the image 32 (in black and white), shown in FIG. 3, is shown to be run-length encoded. This encoding is done starting from the number of white pixels for each scan line. For example, in the first row in FIG. 4, the first row of the image 32 (in FIG. 3) is encoded by counting the number of white pixels appearing at the beginning of the first row of the image 32. Since the first pixel of the image 32 is black, the number of white pixels is '0' as indicated in the first row and column position of FIG. 4. Next, there is one black pixel at the first position of the first row and column of the image 32, thus, the value appearing as the number of black pixels in the second column of the first row of FIG. 4 is '1'. Next, there are two white pixels in a row-sequence in the first scan line following the first black pixel in image 32 of FIG. 3. Therefore, the value '2' appears in the third position of the first row of FIG. 4. Next, since there is one black pixel after the two white pixels in the image 32, the value '1' appears in the fourth position of the first row of FIG. 4. Following the same, there is one white pixel after the black pixel in the image 32 of FIG. 3. Thus, the value '1' appears in the fifth position of the first row of FIG. 4. There are 4 black pixels sequentially appearing in the image 32 after the white pixel, thus, the value '4' appears in the sixth column of FIG. 4. Next, there are 13 white pixels sequentially-positioned, thus, the value 13 appears in the seventh position of FIG. 4 followed by a value of '1' representing the last black pixel in the first scan line of the image 32.

Each scan line of the image 32 is similarly run-length encoded and represented in a respective row of FIG. 4. Such encoding, however, still requires the entire image 32 to be examined before it can be encoded as described above. It has been estimated that the additional time required for such examination is approximately 30%. Another problem with using solely run-length encoding as described hereinabove is that in the event a particular scan line is made up of one type of pixel, i.e. black or white, in its entirety, assuming there are 1728 pixels in the scan line, 11 bits are required to represent the scan line.

Differences in encoding are somewhat dependent upon the way in which run-length encoding is implemented. In FIG. 5, an image bitmap is shown to undergo run-length encoding at 34. A bitmap of an image is the scanned image represented in '1's and '0's for black and white images. After run-length encoding at 34, one of two types of encoding may be performed, one-dimensional encoding or two-dimensional encoding. At 36, one-dimensional encoding is implemented where in accordance with statistical information, the possibility of having certain sequences of bits appear more often than others is defined. According to this information, run-length sequences are encoded using predefined bit sequences of variable length. These sequences are defined in the T.4 standard. The encoding bit sequences are carefully chosen to minimize the number of bits necessary to encode common images. For example, in most of the images transmitted by facsimile, there are typically many more white dots than black ones (a text page is a good example of such higher occurrences of white dots). This is due to white dots occupying larger areas on a page, such as blank areas, than black dots.

The T.4 standard defines a black run-length having 1 black dot to be represented by the binary value "010" whereas a black run-length having 2 black dots is to be represented by the binary value "11" and a black run-length having 3 black dots is to be represented by the binary value "10". This is sensical since one black dot is very thin and occurs more rarely than two or three black dots representing well-visible lines, such as visible straight line "|" or a pen stroke.

The same holds true for white run-length representations. The run-length of one white dot is represented by the binary value "000111" whereas the run-length of two dots is represented by the binary value "0111". Due to the infrequent occurrence of short white run-lengths as compared with short black run-lengths, the former are assigned longer bit sequences than the latter. On the other hand, only binary bits ("010011011") are required to encode a whole white line, which is a white run-length of 1728 pixels. This type of encoding reduces the file size of standard text documents as well as other types of documents. For example, a certain sequence of bits that are known to have appeared often in the past, may be represented by 3 bits whereas a sequence of bits that is known to have appeared less frequently is assigned a much larger number of bits, such as perhaps 13 or 15 bits. In this manner, an image is condensed significantly and transmitted significantly more efficiently in cases where the image includes sequences that are represented with less number of bits in accordance with the T.4 standard. These bit representations are adjusted so as to achieve maximum compression for images that are typically sent by fax, i.e. printed and handwritten text, simple drawings and the like.

For images where, for example, the bits are alternatively black and white, i.e. one pixel is black and the next one is white and the next one is black and so on, one-dimensional encoding produces a file size that is likely to be bigger than the file size that would have been produced if no encoding was performed, which obviously defeats the purpose of encoding. However, the latter types of images are more rare than frequent-occurring.

In FIG. 5, at 38, optionally, two-dimensional encoding may be performed where the difference between the pixels of two sequentially-situated scan lines is calculated. For example, the first pixel of the first row, in FIG. 3, is compared to the first pixel of the second row and a difference, if there is one, is noted. It just so happens that in the example of FIG. 3, these two pixels are alike and thus no difference would be noted. Similarly, the pixels of the second row would be compared with the pixels of the third row and the difference would be noted and so on. This results in a substantially more compact size of the fax file thereby decreasing transmission time and decreasing the need for a larger storage space. However, if the difference in the two lines is substantial, one-dimensional encoding is performed.

In FIG. 6, a prior art fax network system 40 is shown to include a fax machine 42, a PSTN 44, an access server 46, Internet 48 and a user 50. The fax machine 42 transmits a fax document through the PSTN 44 to the access server 46, which includes one or more modem devices for receiving the fax document, performing de-compression and re-compression on the fax document and re-transmitting the document, in the form of a Tag Image File Format (TIFF) file, as an attachment to an email message using Simple Mail Transfer Protocol (SMTP), through the Internet 48, to the user 50. TIFF is defined by Adobe Developer's Association and adopted by the industry-at-large as a standard for file transfers and particularly, the RFC-2306, a subset of this standard, defines fax transmission over the Internet. SMTP is a standard protocol used to transfer email messages over the Internet. It is defined by the RFC-821 and many other related documents. The reason for performing de-compression and re-compression is to remove errors prior to re-transmission of the fax document to its ultimate destination.

Similarly, when the user 50 transmits a fax document to the fax machine 42, the document is transmitted in the form of an email attachment, through the Internet 48, to the access server 46 where it is de-compressed and re-compressed, parsed from the email message and sent as a fax document through the PSTN 44 to the fax machine 42. The reason for re-encoding or re-compressing is that many fax machines do not support error correction mode (ECM). In the absence of ECM, the received image is likely to be corrupted due to errors in transmission. Fax machines try to compensate for errors by re-synchronizing but blank pages or duplicate fax lines end up being printed instead. Quite often, the image is to be viewed by computer software in which case many image viewers are not robust enough. Thus, it is necessary to de-compress the fax document, remove errors, and subsequently re-compress the image.

Another reason for encoding is to save costs. That is, if the sending fax machine is an unsophisticated and thus inexpensive machine, it will send fax documents using a lower quality encoding algorithm such as MH-encoding. The access server can then re-encode the faxed document with a more sophisticated encoding scheme before forwarding the document to its intended receiving fax machine destination thereby enhancing the quality of the fax transmission while employing an inexpensive fax machine.

It should be noted that because encoded fax pages tend to occupy even more space (about 50 kbytes) than non-encoded fax pages, access servers try to re-encode the fax document "on-the-fly". Thus, it is important to perform the re-encoding as quickly as possible.

FIG. 7 shows, in high-level block diagram form, the functions performed by the access server 46 of FIG. 5, while re-compressing a fax image. At 52, the encoded image is received and at 54, it is decoded to obtain a bitmap. An example of a bit map is presented in FIG. 3. The bitmap is saved at 56. A bitmap may be saved in a reduced resolution fashion such that every other scan line is saved rather than every scan line. This results in reduced resolution of the image in most cases while maintaining the image legible. Alternatively, a bitmap may be converted to a higher resolution image than that which was transmitted by duplicating the scan lines. Such scan line manipulation is shown at 58 in FIG. 7.

At 60, the scan line manipulation is undone to retrieve the original bit map and thereafter, at 62, the image is re-encoded to produce the re-encoded image at 64. The errors in the image, if any, are corrected during decoding at 54. The decoder performs one-dimensional or two-dimensional decoding depending upon which type of encoding has been performed. The first scan line of an image that is to be transmitted is always one-dimensionally encoded and the remaining scan lines are then encoded using one or two-dimensional encoding. This is perhaps better understood with respect to FIGS. 8 and 9.

FIG. 8 presents a high-level block diagram of prior art decoding processing. In FIG. 8, at 70, an encoded image is received and then either one-dimensional or two-dimensional decoding is performed, at 72 and 74, respectively. As previously mentioned, the first scan line is always decoded using one-dimensional decoding. After 72, a run-length representation of the one-dimensionally-decoded image is performed at 75, after which a reference scan line (typically the scan line previous to the current scan line) is saved in a buffer at 76. The reference line is to be used for two-dimensional decoding at 74. As previously discussed, the previous scan line is compared to the current scan line in two-dimensional encoding and decoding. After two-dimensional decoding, a run-length representation of the two-dimensionally-decoded image is performed at 78. The output of the run-length representations of 75 and 78 are combined at 80 and run-length decoding is performed producing a bit map at 82.

As shown in FIG. 9, during re-encoding, the bit map 82 is provided to a run-length re-encoder at 84 for re-encoding thereof after which, the output of the re-encoder compared to a reference scan line, the latter being optionally stored in a buffer 86. This is assuming two-dimensional encoding and decoding is being employed. After the comparison, two-dimensional re-encoding is performed at 90. One-dimensional re-encoding is performed on the first scan line at 88 and alternatively on the remaining scan lines if that is the type of encoding and decoding scheme being employed. The output of the one and two-dimensional re-encoders are combined to form an encoded image at 92. Accordingly, in prior art fax systems and methods, a bit map is generated between decoding and re-encoding of the fax image, which is a time consuming process generally performed by the access server.

Thus, the need arises for a fax system and method, employing packet switching networks including access servers, to reduce the time for decoding and re-encoding fax images thereby increasing the efficiency of the system.

SUMMARY OF THE INVENTION

Briefly, a fax decoding/re-encoding system for transferring fax images between a sending fax machine and a receiving fax machine includes a decoder responsive to an encoded fax image defined by rows of scan lines in accordance with an embodiment of the present invention. The decoder decodes the scan lines of the encoded fax image and generates run-length representation of the encoded fax image. A scanline manipulation device is responsive to the run-length representation for manipulating the same and generating a manipulated fax image without generating a bitmap of the encoded fax image. The fax decoding/re-encoding system further including a re-encoder responsive to said manipulated fax image and adaptive to generate a re-encoded fax image that is substantially the same as the encoded fax image, wherein the fax decoding/re-encoding system avoids the need for a bitmap for generating a re-encoded fax image thereby substantially reducing re-encoding time.

The foregoing and other objects, features and advantages of the present invention will be apparent from the following detailed description of the preferred embodiments which make reference to several figures of the drawing.

IN THE DRAWINGS

Figure 6:
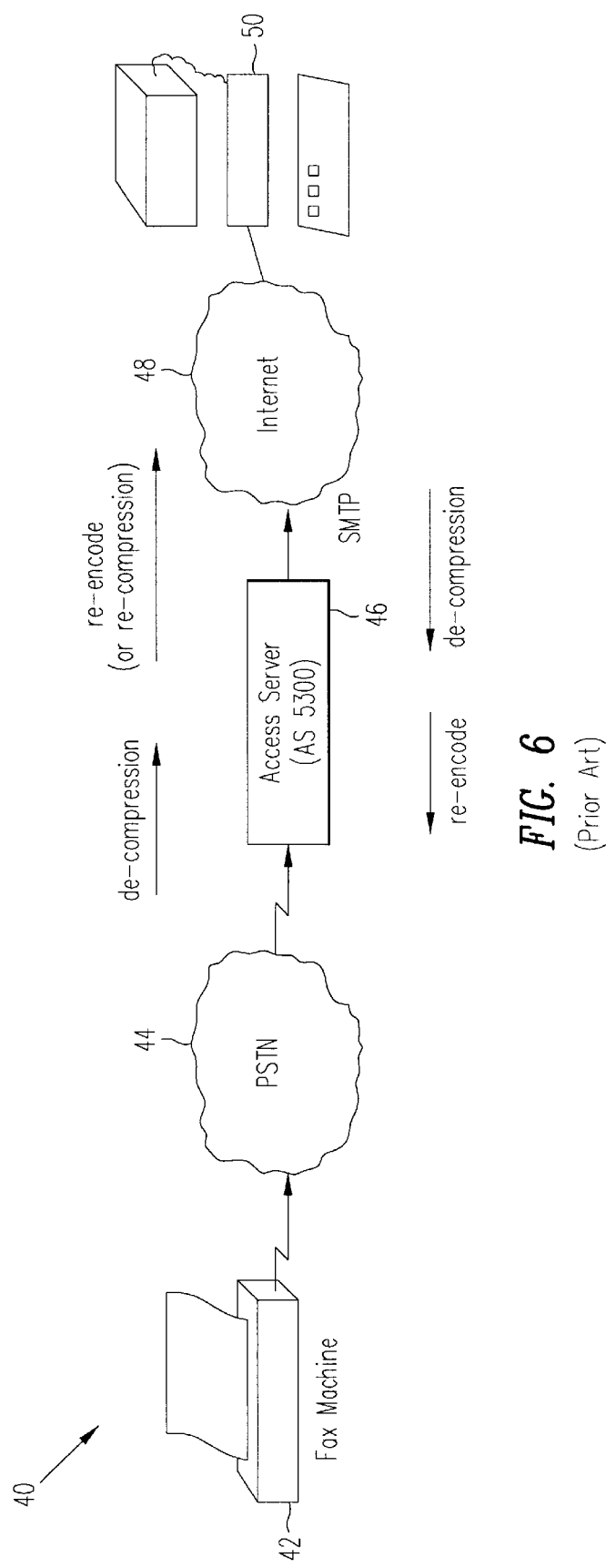

FIG. 6 depicts a prior art fax network system 40 is shown to include a fax machine 42, a PSTN 44, an access server 46, Internet 48 and a user 50.

Figure 1:
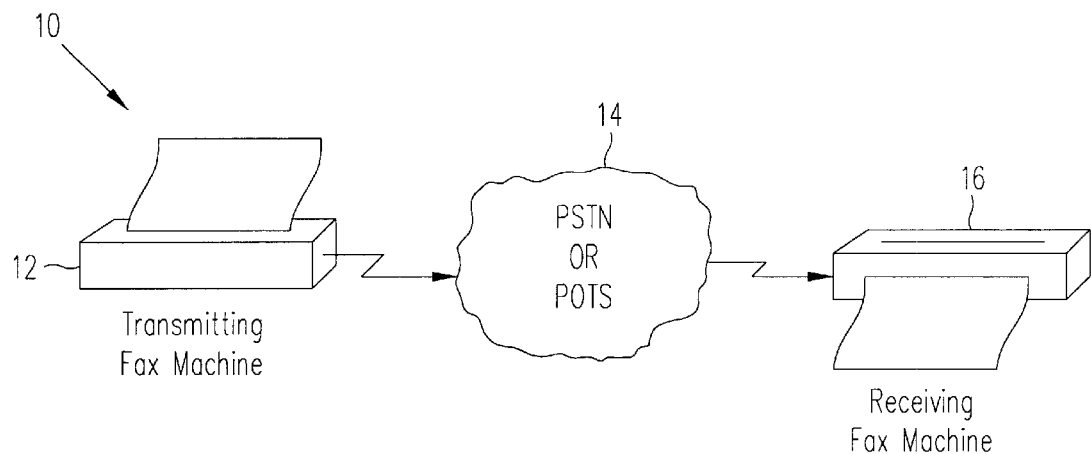
FIG. 1 shows a high-level diagram of a prior art conventional fax transmission and reception system 10.
Figure 2:
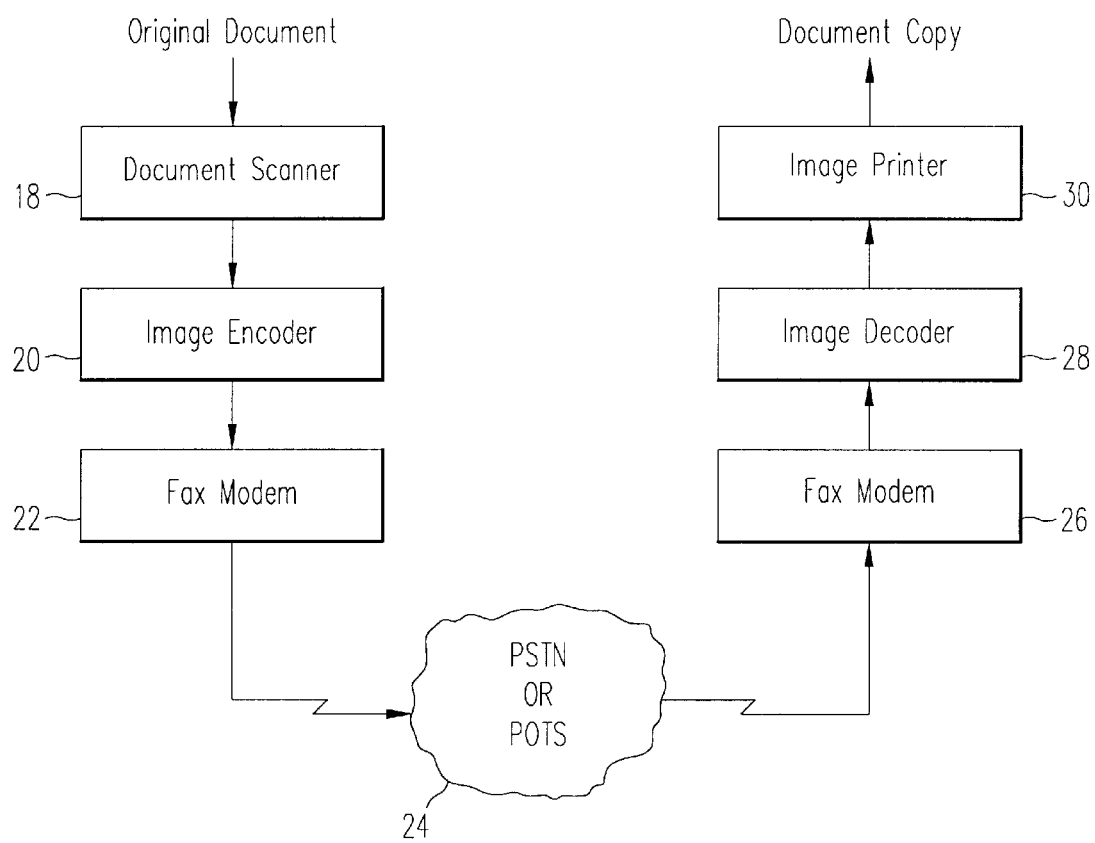
FIG. 2 illustrates steps, in flow chart form, to show the processing of fax information in the form of a fax document through the fax machines 12 and 16 in FIG. 1.
Figures 3, 4:
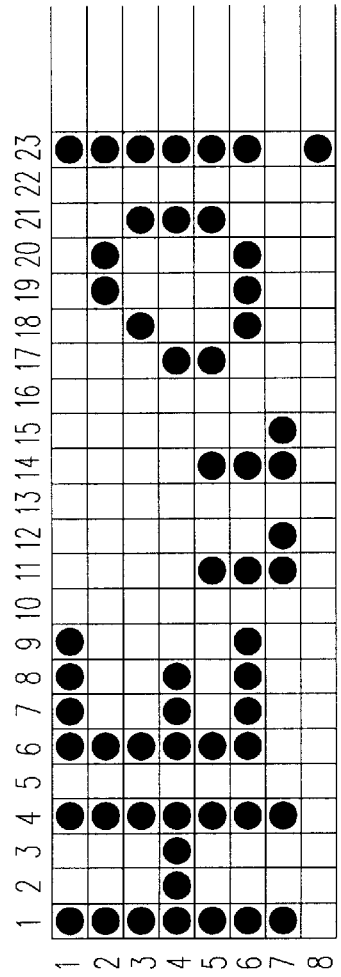
FIG. 3 shows an example of a fax image 32 of the words "HELLO!"
FIG. 4 shows an example of a run-length encoding.
Figure 5:
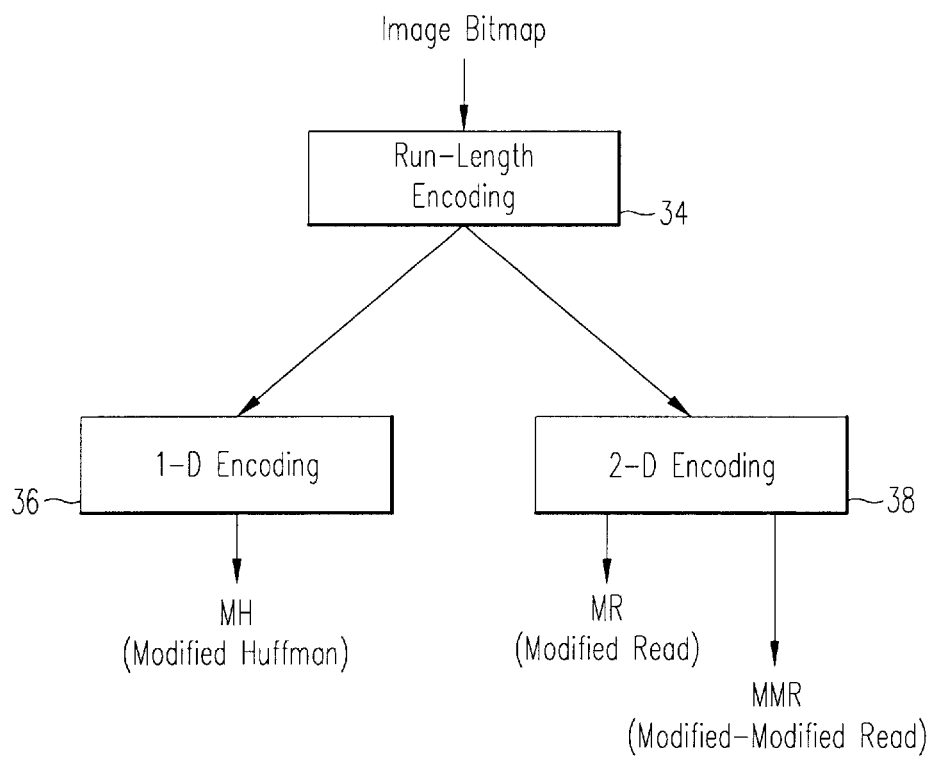
FIG. 5 illustrates an image bitmap undergo run-length encoding and one and/or two-dimensional encoding.
Figure 7:
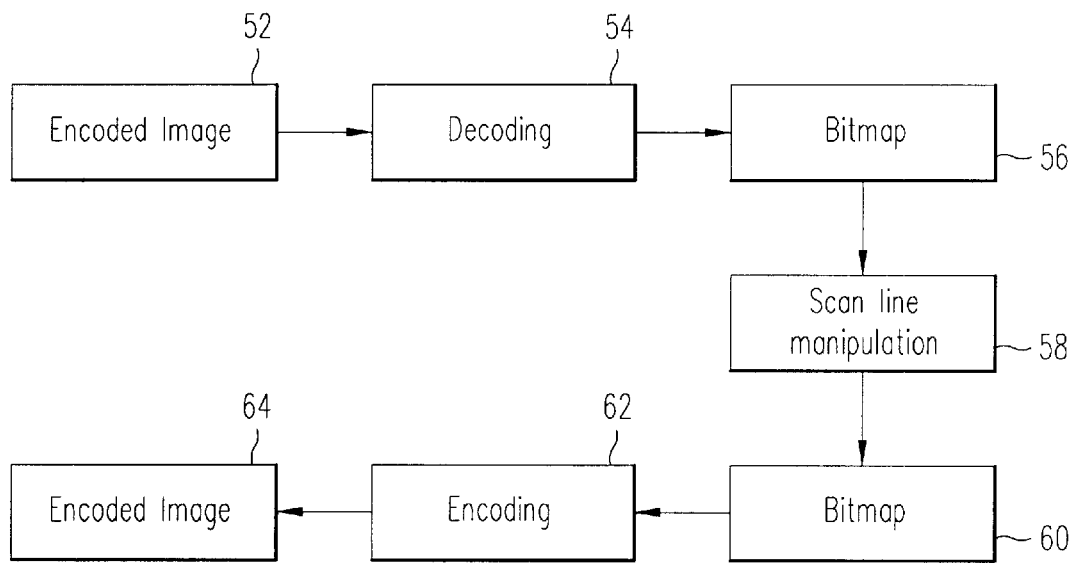

FIG. 7 shows, in high-level block diagram form, the functions performed by the access server 46 of FIG. 5, while re-compressing a fax image.

Figure 8:
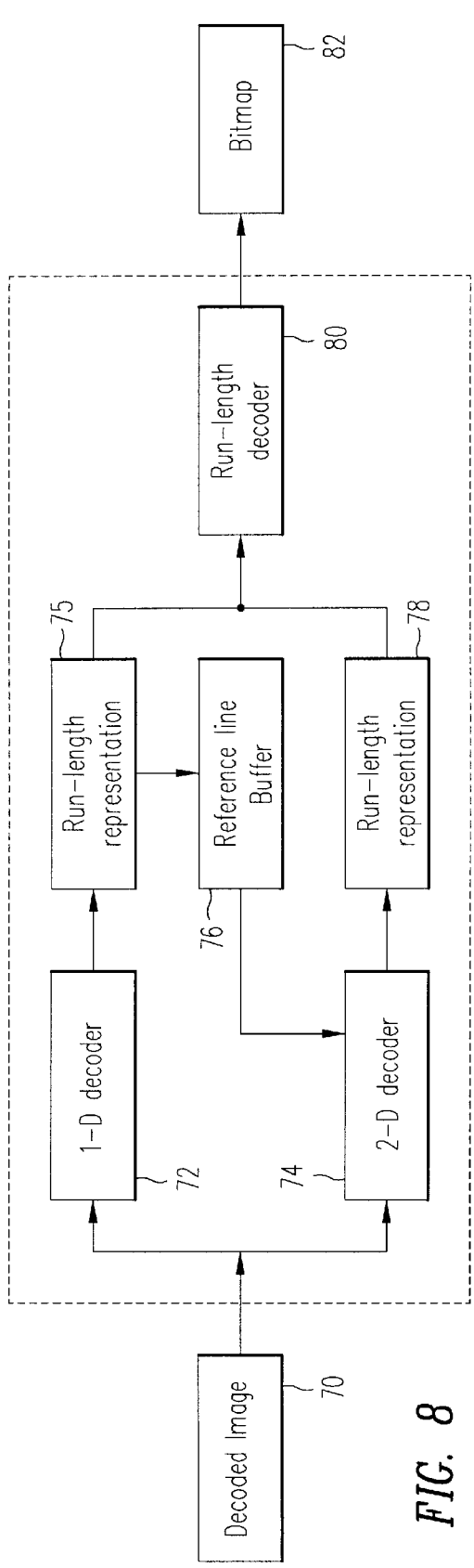

FIG. 8 presents a high-level block diagram of prior art decoding processing.

Figure 9:
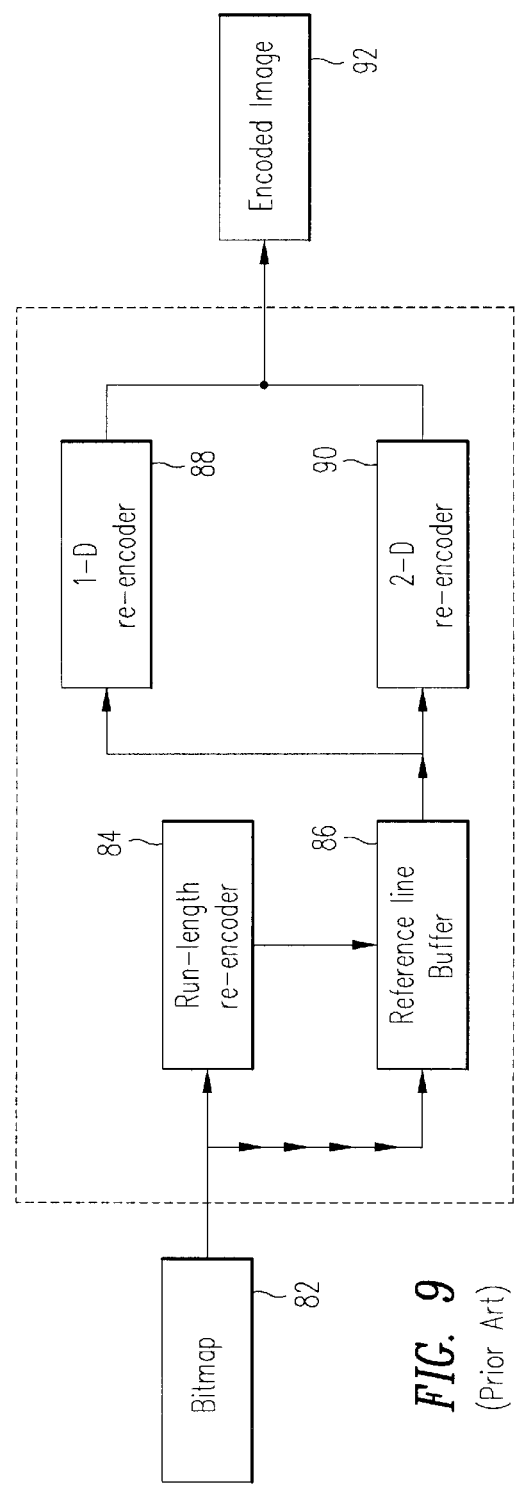

FIG. 9 shows a prior re-encoding process.

Figure 10:
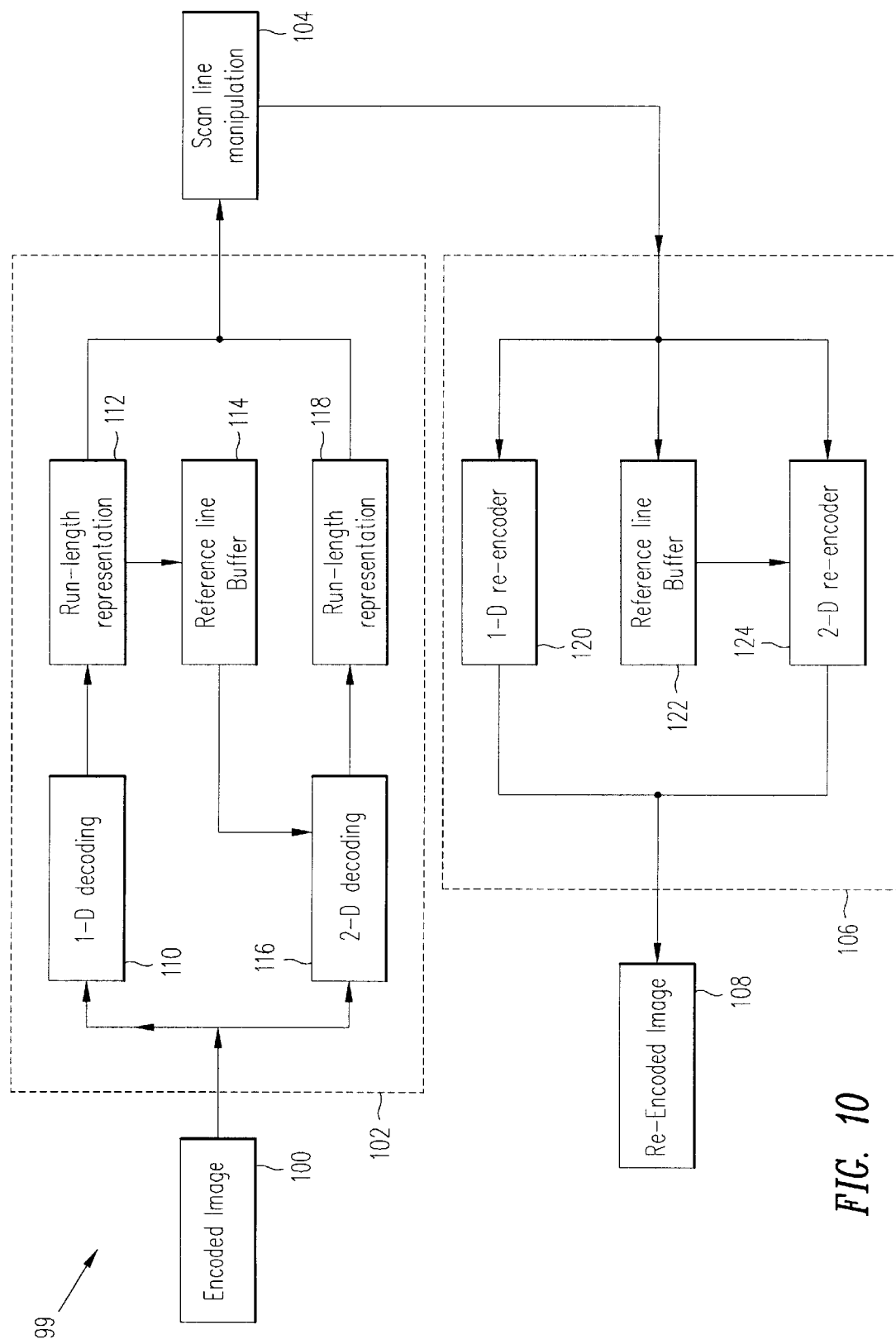

FIG. 10 shows a fax decoding/re-encoding apparatus 99 in accordance with an embodiment of the present invention.

DETAILED DESCRIPTION OF THE PREFERRED EMBODIMENTS

Referring now to FIG. 10, an embodiment of the present invention is shown to include a fax decoding/re-encoding apparatus 99 including an encoded fax image 100, a decoder 102, a scanline manipulation device 104, a re-encoder (re-compressor) 106 and an re-encoded image 108. In one embodiment of the present invention, the apparatus 99 is employed by and within an access server, such as the access server 46 in FIG. 6, for decoding and re-encoding fax images between fax machines either through a packet switching network, such as the Internet, or through the public switching telephone network. In alternative embodiments of the present invention, the apparatus 99 is not restricted to being in or employed by an access server, rather, any device, such as an intelligent modem, digital signal processor (DSP), consumer fax/modem product, a CPU or any device capable of performing re-encoding or recompression may be employed.

The embodiment of FIG. 10 is preferably used for Group 3 fax transmissions to expedite re-encoding of fax images and to eliminate costly bit scanning. It has been experienced that the use of the apparatus 99 reduces re-encoding time by 30% due, in large part, to the elimination of costly bit scanning in the case of one-dimensional encoding.

The apparatus 99 of FIG. 10 may be employed for one or two-dimensional encoding applications. To facilitate one or two dimensional encoding, it is better to represent a scanline using two arrays (or lists): an array of run-lengths and an array of indexes, which will associate each pixel on the scanline with a particular run length. As will be evident shortly, the second array can be easily generated at the same time during the decoding process. It should be noted that the blocks shown in FIG. 10 can be implemented in hardware or software without departing from the scope and spirit of the present invention.

In FIG. 10, the decoder 102 is shown to include a one-dimensional decoder 110 coupled to a one-dimensional run-length representation block 1112, which is in turn coupled to a reference line buffer 114. The decoder 102 is further shown to include a two-dimensional decoder 116 and a two dimensional run-length representation block 118. Alternatively, the reference line buffer 114 may be embedded in the one-dimensional decoder 110 or the two-dimensional decoder 116.

The re-encoder 106 is shown to include a one-dimensional re-encoder 120, a reference line buffer 122 and a two-dimensional re-encoder 124. Alternatively, the reference line buffer 122 is embedded in the one-dimensional re-encoder 120 or the two-dimensional re-encoder 124. The reader is reminded that references to "re-encoder" or "re-encoding" rather than "encoding" or "encoder" are due to the fact that fax information, prior to being received by the access server, is encoded.

In operation, the encoded image 100 is received by the decoder 102 at the one-dimensional decoder 110 or the two dimensional decoder 116 or both depending on which encoding and decoding scheme is being employed, as discussed in the prior art section hereinabove. When two-dimensional encoding and decoding is employed, the first scanline is one-dimensionally decoded as there is no prior or previous scanline to which the current scanline (the first scanline) is compared. Additional details of the way in which two dimensional encoding is performed is provided later hereinbelow. Thus, the first scanline is always processed by the one-dimensional decoder 110. The decoder 110 provides the decoded fax image to the run-length representation block 112 for representing the decoded image in run-length form, as discussed hereinabove and the block 112 ultimately provides the one-dimensional run-length representation of the decoded fax image to the scanline manipulation device 104. The scanline manipulation device 104 may receive combined run-length representations where two-dimensional decoding is employed as will be obvious shortly.

When two-dimensional decoding is employed, the encoded image 100 is received by the decoder 116. Two-dimensional decoding is performed on the received encoded image 100 by using reference lines obtained from a comparison of the current scanline with the previous scanline, the previous scanline being saved in the buffer 114 as the reference scanline from the block 112. The two-dimensional decoder 116 decodes the image and provides the decoded image to the block 118 for representation of the decoded image in run-length form. The output of the block 118 is then received, in combination with the output of the block 112, by the scanline manipulation device 104. The device 104, as previously discussed, may remove every other scanline resulting in a lower resolution of the fax image or may duplicate scanlines resulting in enhanced images.

The output of the device 104 is then provided to the re-encoder 106 at the one-dimensional re-encoder 120, the two-dimensional re-encoder 124 or both depending upon the encoding/decoding scheme being employed.

The reference line buffer 122 is used to store the reference scanline (previous scanline), which is provided to the two-dimensional re-encoder 124 for re-encoding of the manipulated image received from the device 104. Even when two-dimensional re-encoding is employed, the first scanline is provided to the one-dimensional re-encoder 120 for processing. When one-dimensional encoding/decoding is employed, the remaining scanlines are provided to the one-dimensional re-encoder 120 for re-encoding thereof. The combination of the outputs of the one-dimensional re-encoder 120 and the re-encoder 124 become the re-encoded image 108 for transmission thereof to a fax user.

Hence, in accordance with the present invention, there is no need to produce a bitmap of the fax image prior to re-encoding by the encoder as shown in the prior art system of FIG. 7. Additionally, there is no extra computing time needed by the present invention when its teachings are implemented in software, by for example, a central processing unit (CPU) because basically, the output of the decoding process is passed onto the re-encoding process. In this respect, a list of run-lengths, as opposed to a bitmap, is passed onto the re-encoder thereby eliminating costly bit scanning, which has been known to consume 30% more CPU time in the case of one-dimensional encoding.

In FIG. 10, in the event the encoded image 100 is received as having been one-dimensionally encoded (using an unsophisticated sending fax machine), and which needs to be converted to two-dimensional encoding for use by a more sophisticated receiving fax machine, each scanline is represented using an array of run-lengths.

In FIG. 10, the fax decoding/re-encoding apparatus 99 includes a processor (or computer medium), which may be located in the decoder 102 or the re-encoder 106, and some type of storage area, a computer readable medium, for storing software programs for carrying out the various functions discussed herein. This storage area is located either internally or externally to the fax decoding/re-encoding apparatus 99. The processor executes code from the computer readable medium for effectuating the functions discussed herein.

Now, additional details for two-dimensional encoding using run-length representation are presented. First, it is noted that principles of two-dimensional encoding are outlined in the ITU T.4 and T.6 standards. In the following discussion, implementation of certain steps from the coding procedure using run-length representation of scan lines rather than the bitmap representation is presented.

As previously stated, every scan line can be represented as a sequence of run-lengths, i.e. an array or a list of integers representing lengths of alternating sequences of white or black pixels starting with a white run-length. An example is now presented:

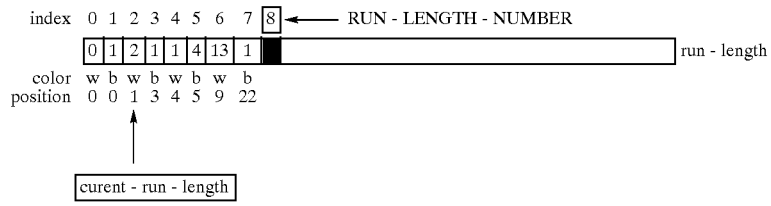

The current run-length is an index (or a pointer), which points to the run-length element being processed. In the example above, the current run-length is '2'. The current color is a variable corresponding to the color, i.e. black or white, of the current run-length element. It is initialized to white at the beginning of the line and is changed to the opposite color each time the current run-length is advanced to the next element. The current position is the sum of run-lengths from the beginning of the scan line to the current run-length. In the above example, the current position up to the position of the current run-length is '3'. The run-length number is the number of elements in the array. In the example above, the run-length number is 8. The array and four variables, i.e. the current run-length, the current color, the current position and the run-length number described hereinabove, constitute a representation of a run-length encoded line.

Two-dimensional encoding employs two scan lines at any given time, a reference line and a coding line. These two lines are generally the run-length encoding of the respective original bitmap scan lines. Two-dimensional encoding thus operates on two sets of parameters:

| | |
|---|---|
| Ref->run_length[] | code->run_length[] |
| Ref->current_run_length | code->current_run_length |
| Ref->current_color | code->current_color |
| Ref->current_position | code->current_position |
| Ref->run_length_number | code->run_length_number |

By way of example, a reference having all white pixels will have the following parameters:

| | |
|---|---|
| Ref->run length[0] = 1728; | /* number of white pixels in a line having only white pixels |
| Ref->current_run_length = 0; | |
| Ref->current_color = White; | |
| Ref->current_position = 0; | |
| Ref->run_length_number = 1; | /* only 1 run-length since all pixels in the line are white */ |

The parameters of the coding line, which is one of the lines of the image sought to be encoded are generally generated by the decoder, otherwise, they are initialized explicitly.

There are certain pointers, a0, a1, b1 and b2 used for encoding the coding line, with reference to the reference line expeditiously. At the outset, a0 is placed just before the first picture element. This is due to the decoder always starting a line with a white run-length. Thus, initially, a0=0. Next, a1 is calculated to be:

$$a1 = a0 + code\text{->}run\_length[code\text{->}current\_run\_length]$$

Thereafter, b1 is detected as the first changing element of the reference line to the right of a0 and opposite in color to that of the color of a0. In this example, the first black pixel after a white pixel to the right of a0 would be b1.

Figure 11:
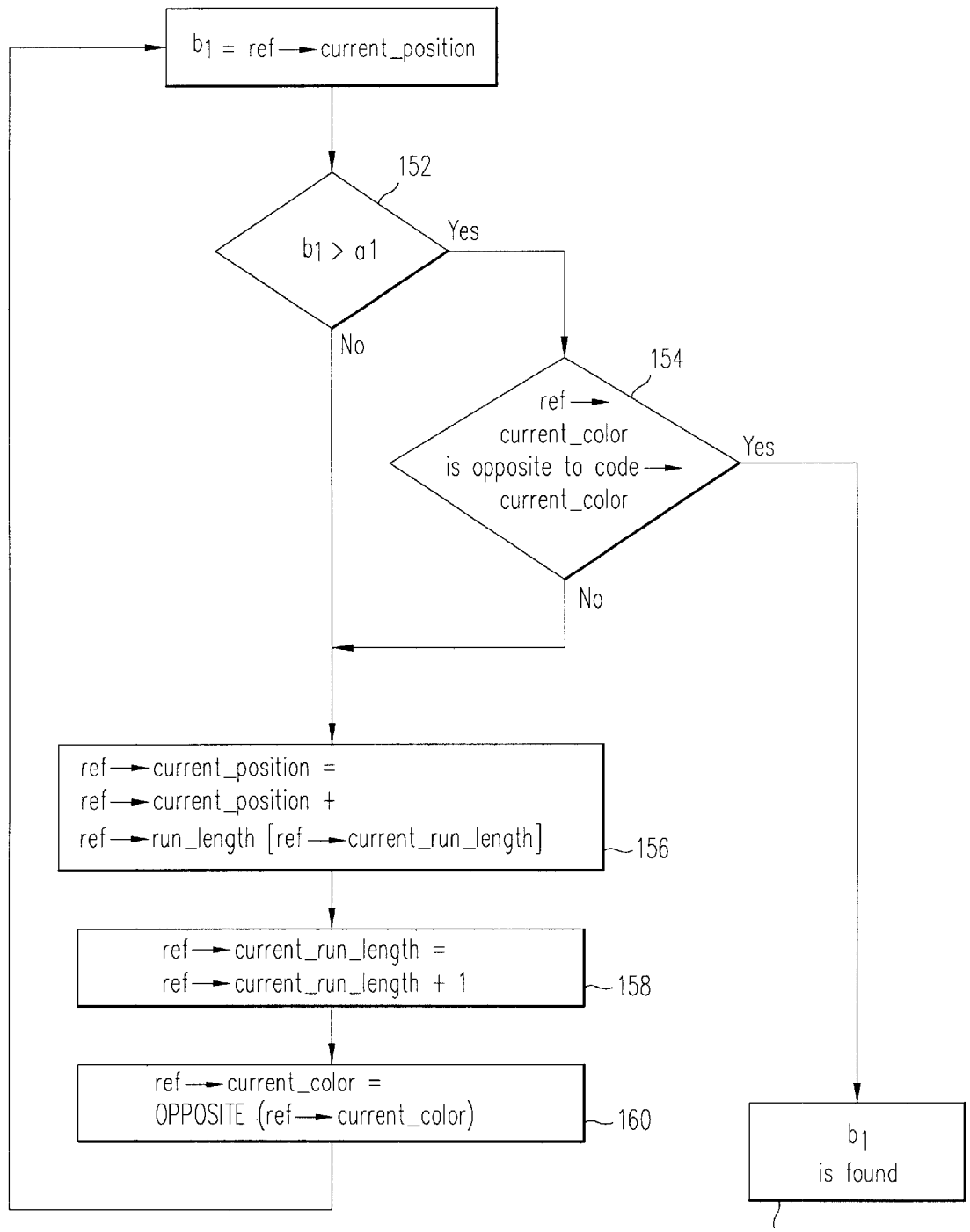

FIG. 11 shows a flow chart of the way in which b1 is calculated. That is, at step 150, b1=ref->current_position and thereafter at step 152, a determination is made as to whether or not b1 is greater than $a_1$ and if so, at 154, another determination is made, this time as to whether or not the ref->current_color is opposite to the code->current_color and if so, b1 is found at step 162.

If at 152, it is determined that b1 is not greater than a1, the process continues to step 156 where ref->current_position is equal to ref->current_position plus ref->run_length[ref->current_run_length]. Thereafter, at step 158, the ref->current run_length is incremented by one and thereafter, at step 160, the ref->current_color is equal to the opposite color of the ref->current_color. Next, the process goes back to step 150. If at 154, the outcome of the determination is such that ref->current_color is not opposite of the code->current_color, the process continues from step 156.

Beyond FIG. 11, b2 is calculated as:

$$b2 = b1 + ref\text{->}run\_length[ref\text{->}current\_run\_length]$$

Next, it is determined whether or not b2 is to the left of a1 and if so and if b2 is less than a1, then a0 is placed in the coding line just under (or in like pixel column of) b2. Next the code->current_position is set equal to b2 and the code->run_length [code->current_run_length] is equal to b2–a0, and finally, a0 is set equal to b2, Next, a2 need not be detected because $a_2 = a_1 + $code->run_length [code->current_run_length+1]. Next, a0 is set equal to a2, the code->current_position is set equal to a2 and the code->current run_length code->current_run_length+2. The color remains unchanged. Next, a0 is set equal to a1, the code->current_run_length=code->current_run_length+1 and the code->current color is set to the opposite color of the code->current_color.

The above process proceeds until code->current_run_length is equal to the code->run_length_number, at which time the end of the line is reached. Since the run-length array for the coding line might be modified by the process described above, optionally, a copy of the coding line is made before the coding line is processed so as to employ the same as a reference line for the processing of the next coding line.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A fax decoding/re-encoding system for transferring fax images between a sending fax machine and a receiving fax machine comprising:
    a decoder responsive to an encoded fax image defined by rows of scan lines, said decoder for decoding the scan lines of the encoded fax image and generating run-length representation of said encoded fax image;
    a scanline manipulation device responsive to said run-length representation for manipulating the same and generating a manipulated fax image without generating a bitmap of the encoded fax image; and
    a re-encoder responsive to said manipulated fax image and adaptive to generate a re-encoded fax image that is substantially the same as the encoded fax image.

2. A fax decoding/re-encoding system as recited in claim 1 wherein Group 3 is used for transmission of fax images between the sending fax machine and the receiving fax machine.

3. A fax decoding/re-encoding system as recited in claim 1 wherein the decoder, scanline manipulator and re-encoder are part of an access server.

4. A fax decoding/re-encoding system as recited in claim 1 wherein the decoder further includes a one-dimensional decoder and a one-dimensional run-length representation block coupled to the one-dimensional decoder, said one-dimensional decoder responsive to the encoded fax image and for one-dimensional decoding of at least one of the scan lines of the encoded fax image and said one-dimensional run-length representation block for providing a one-dimensional run-length representation of the decoded fax image to the scan line manipulation device.

5. A fax decoding/re-encoding system as recited in claim 4 wherein the decoder further includes a two-dimensional decoder responsive to the encoded fax image for two-dimensional decoding of the same.

6. A fax decoding/re-encoding system as recited in claim 5 wherein the decoder further includes a two-dimensional run-length representation block for providing a two-dimensional run-length representation of the decoded fax image to the scan line manipulation device.

7. A fax decoding/re-encoding system as recited in claim 6 wherein the decoder further includes a reference line buffer responsive to the decoded scan lines wherein each of the decoded scan lines is stored within the buffer and used to compare the stored scan line, a reference scan line, to the encoded fax image scan line for two-dimensional decoding.

8. A fax decoding/re-encoding system as recited in claim 1 wherein said re-encoder includes a one-dimensional re-encoder for one-dimensionally re-encoding the manipulated fax image and a two-dimensional re-encoder for two-dimensional re-encoding the manipulated fax image wherein the one-dimensional or two-dimensional re-encoding are selectively employed depending upon the decoding technique being employed.

9. A fax decoding/re-encoding system as recited in claim 1 wherein said decoder includes a one-dimensional decoder responsive to said scan lines of said encoded fax image for one-dimensionally decoding said scan lines and wherein said decoder further includes a two-dimensional decoder responsive to said scan lines of said encoded fax image for two-dimensionally decoding the scan lines wherein said decoder selectively decodes the encoded fax image using either the one-dimensional decoder or the two-dimensional decoder.

10. A fax decoding/re-encoding system as recited in claim 9 wherein a first scan line of the encoded fax image is decoded using the one-dimensional decoder regardless of whether the one-dimensional or two-dimensional decoding is employed.

11. A method for decoding/re-encoding fax information between a sending fax machine and a receiving fax machine comprising:
    receiving an encoded fax image defined by rows of scan lines;
    decoding the scan lines of the encoded fax image and generating run-length representation of the same;
    manipulating the run-length representation to generate a manipulated fax image by without generating a bitmap of the encoded fax image; and
    re-encoding the manipulated fax image to generate a re-encoded fax image that is substantially the same as the encoded fax image.

12. A computer readable medium having stored therein computer readable program code comprising instructions for performing the following steps:
    receiving an encoded fax image defined by rows of scan lines;
    decoding the scan lines of the encoded fax image and generating run-length representation of the same;
    manipulating the run-length representation to generate a manipulated fax image by avoiding the generation of a bitmap of the encoded fax image; and
    re-encoding the manipulated fax image to generate a re-encoded fax image that is substantially the same as the encoded fax image.

13. A fax decoding/re-encoding system for transferring fax images between a sending fax machine and a receiving fax machine comprising:
    means for receiving an encoded fax image defined by rows of scan lines, said decoder for decoding the scan lines of the encoded fax image and generating run-length representation of said encoded fax image;
    a scanline manipulation device responsive to said run-length representation for manipulating the same and generating a manipulated fax image without generating a bitmap of the encoded fax image; and
    means for receiving said manipulated fax image and adaptive to generate a re-encoded fax image that is substantially the same as the encoded fax image.

* * * * *

UNITED STATES PATENT AND TRADEMARK OFFICE
CERTIFICATE OF CORRECTION

PATENT NO. : 6,950,213 B1 Page 1 of 1
APPLICATION NO. : 09/742552
DATED : September 27, 2005
INVENTOR(S) : Gurevich It is certified that error appears in the above-identified patent and that said Letters Patent is hereby corrected as shown below:

At column 10, line 4 please replace "having only white pixels" with --having only white pixels*/--

At column 10, line 48 please replace "current run" with --current_run--

At column 10, line 66 please replace "current run" with --current_run--

At column 11, line 2 please replace "current color" with --current_color--

Signed and Sealed this

Thirtieth Day of January, 2007

JON W. DUDAS
*Director of the United States Patent and Trademark Office*